Dec. 17, 1940.  H. L. PITMAN  2,225,484
COMBINED TYPEWRITING AND COMPUTING MACHINE
Filed Oct. 16, 1936  11 Sheets-Sheet 2

INVENTOR:
Henry L. Pitman
By B. C. Stickney
ATTORNEY.

Dec. 17, 1940.   H. L. PITMAN   2,225,484
COMBINED TYPEWRITING AND COMPUTING MACHINE
Filed Oct. 16, 1936   11 Sheets-Sheet 4

INVENTOR:
Henry L. Pitman
BY B.C. Stickney
ATTORNEY.

Dec. 17, 1940.  H. L. PITMAN  2,225,484
COMBINED TYPEWRITING AND COMPUTING MACHINE
Filed Oct. 16, 1936  11 Sheets-Sheet 5
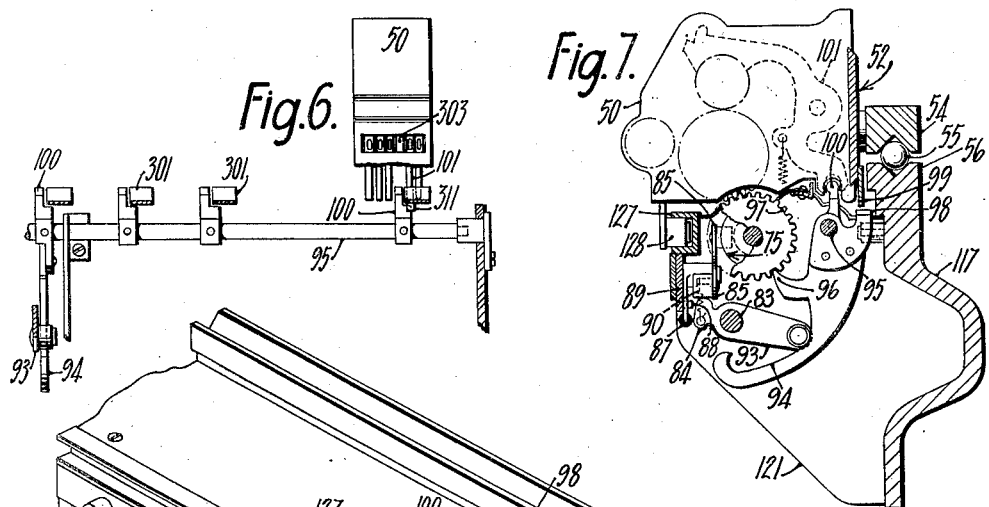
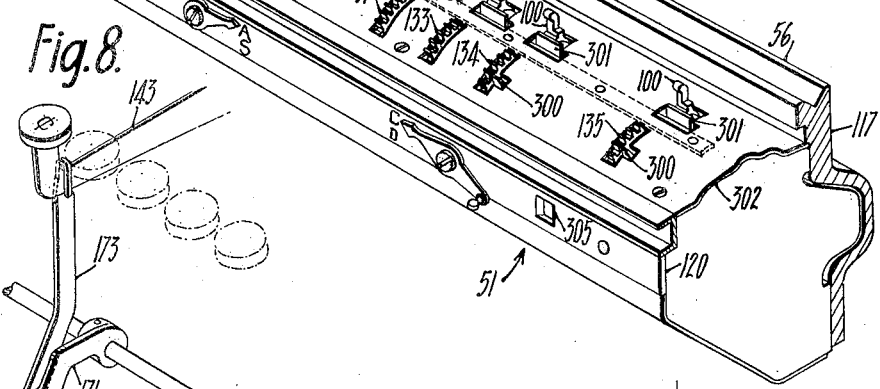
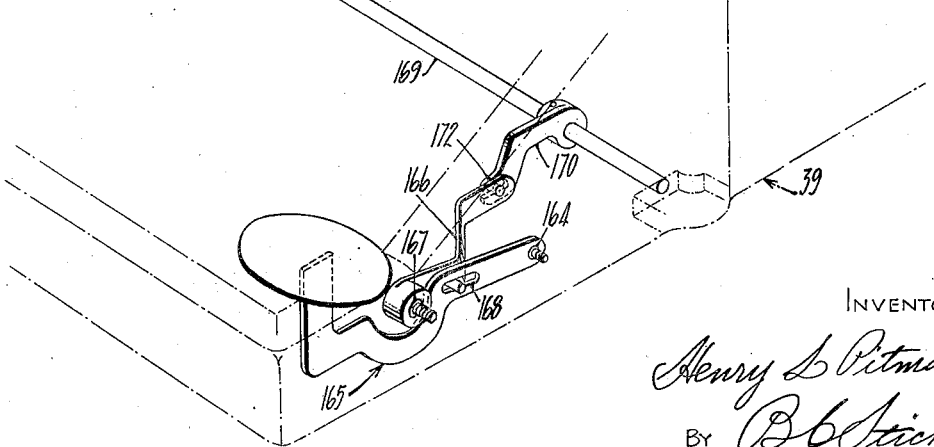
INVENTOR:
Henry L. Pitman
BY B. C. Stickney
ATTORNEY

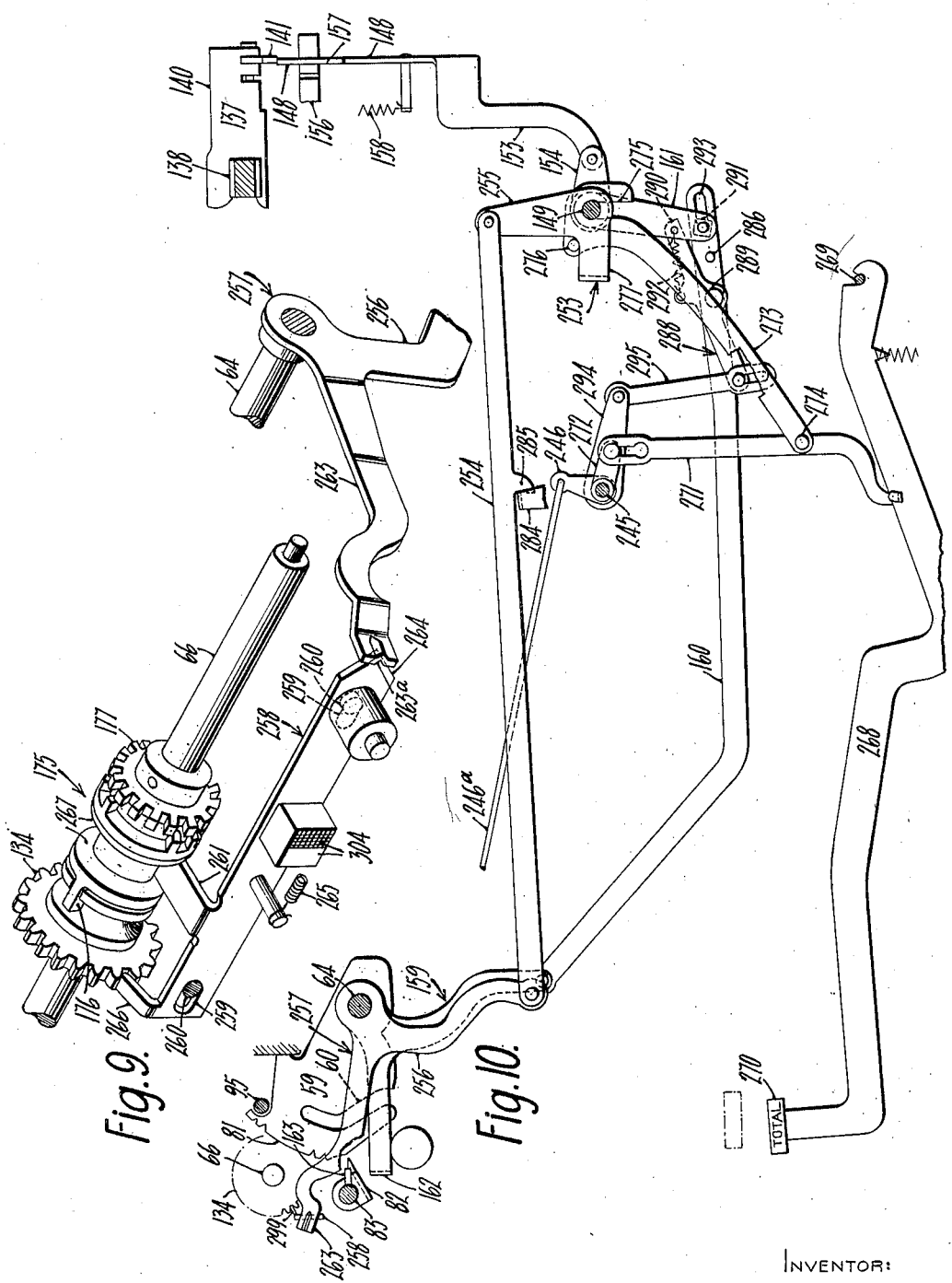

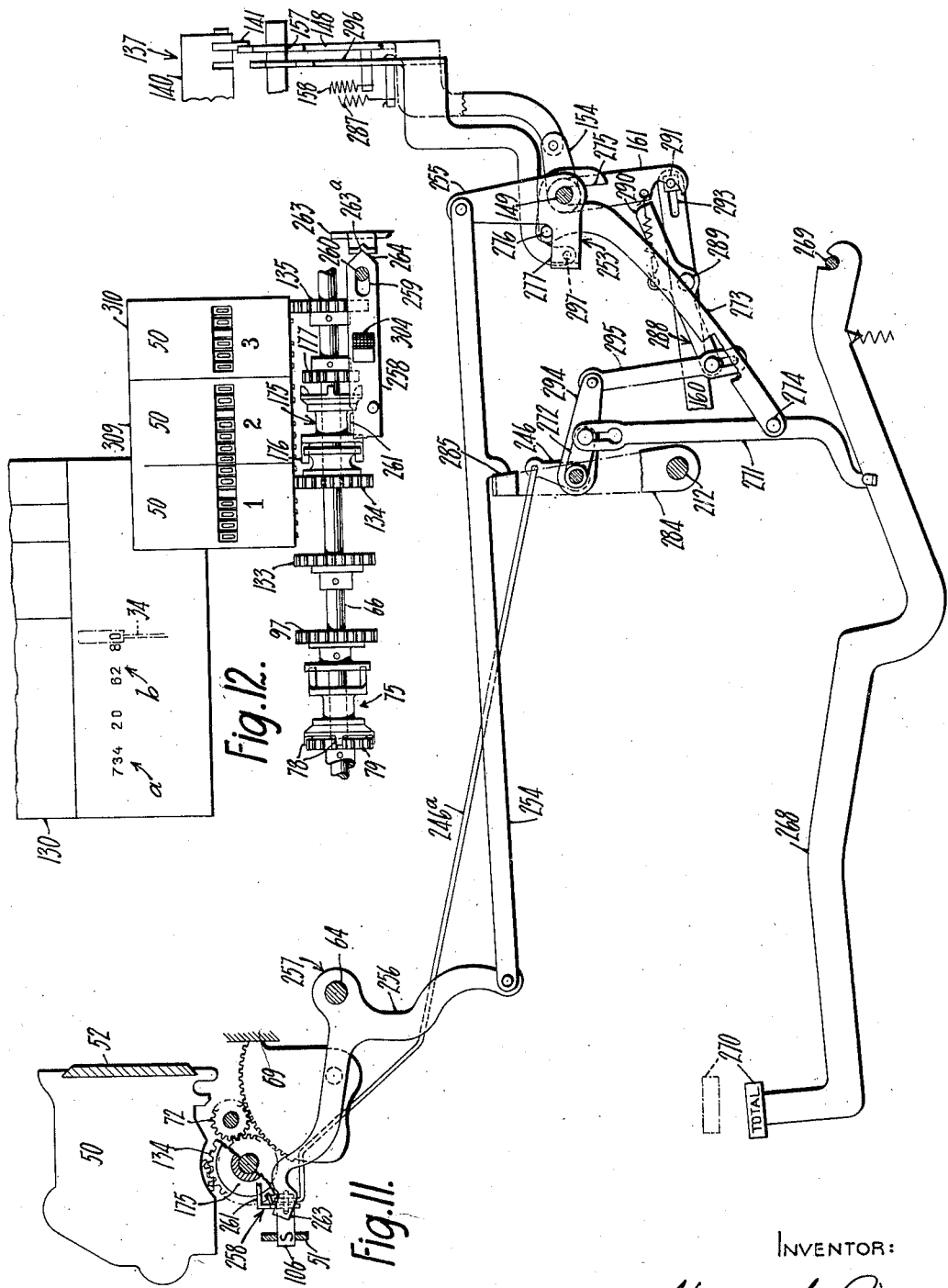

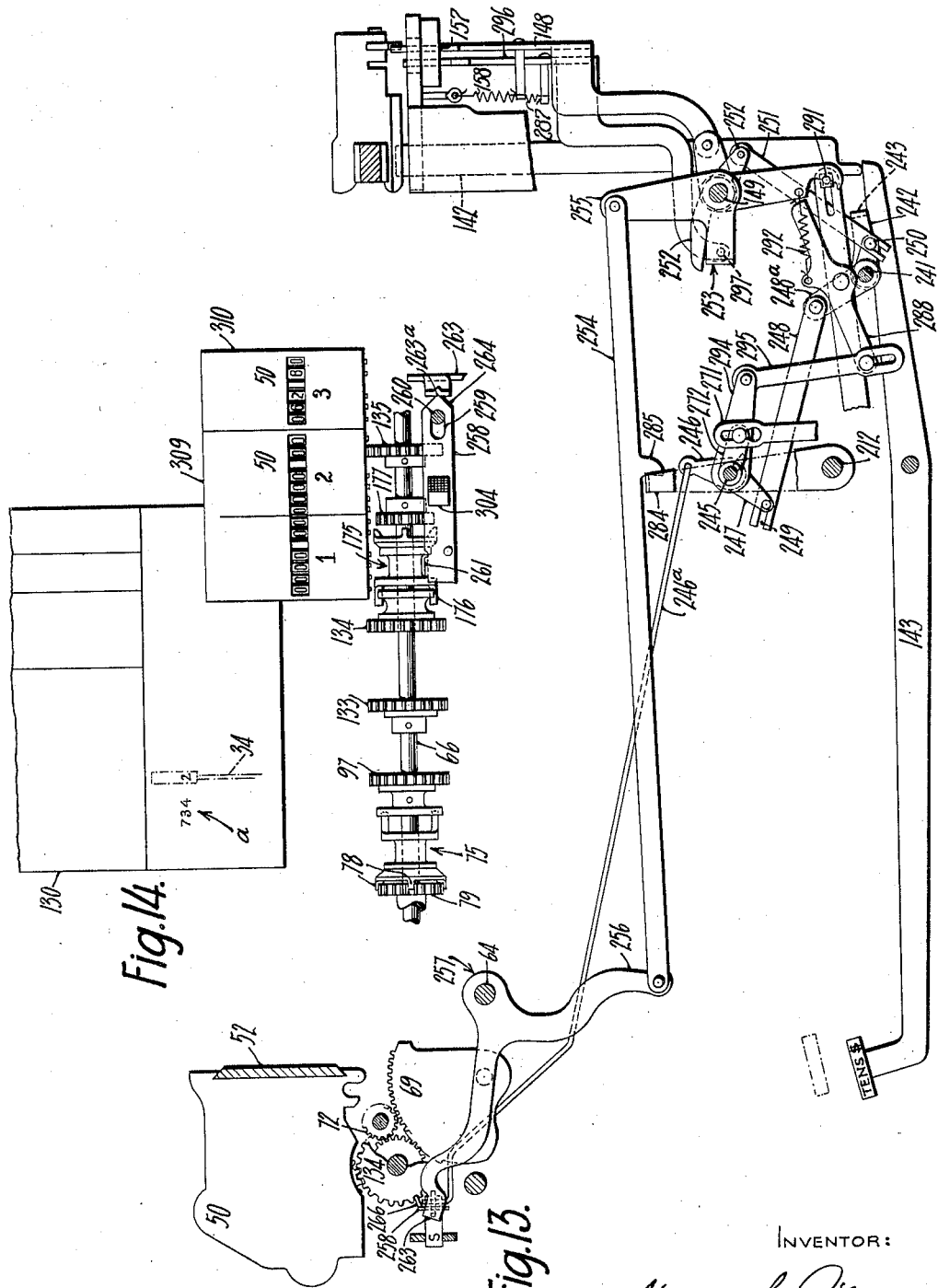

Dec. 17, 1940.   H. L. PITMAN   2,225,484
COMBINED TYPEWRITING AND COMPUTING MACHINE
Filed Oct. 16, 1936   11 Sheets-Sheet 9
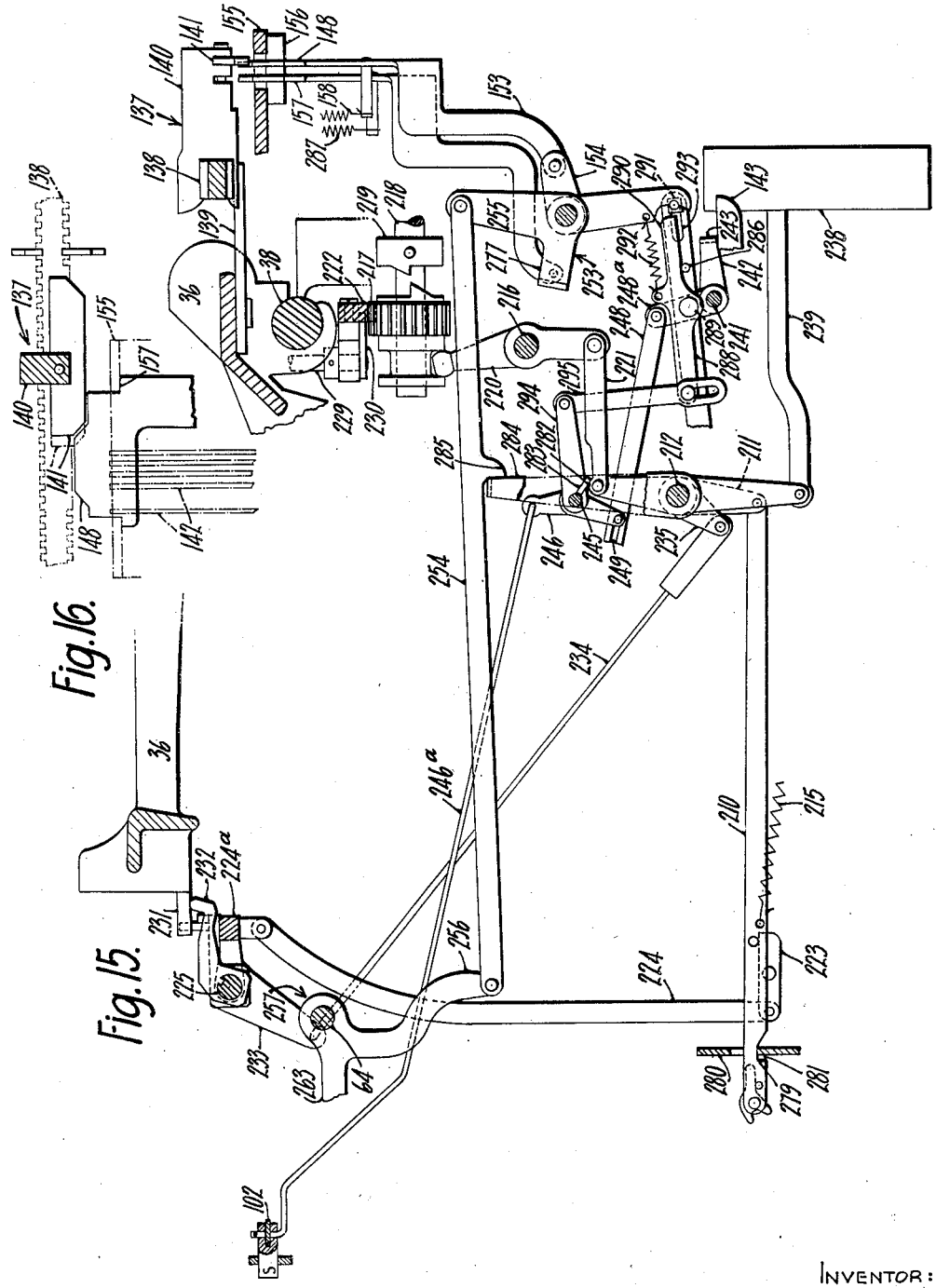
INVENTOR:
Henry L. Pitman
By B C Stickney
ATTORNEY.

Dec. 17, 1940.                H. L. PITMAN                2,225,484
              COMBINED TYPEWRITING AND COMPUTING MACHINE
                    Filed Oct. 16, 1936        11 Sheets-Sheet 10
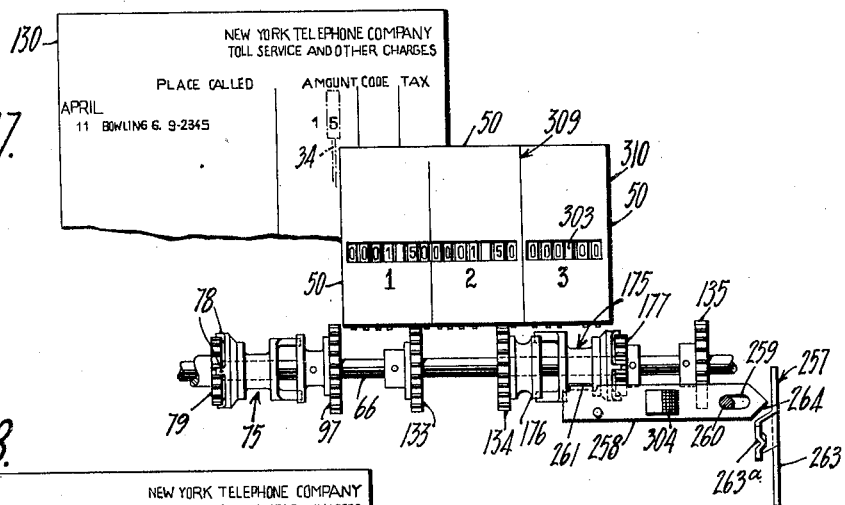
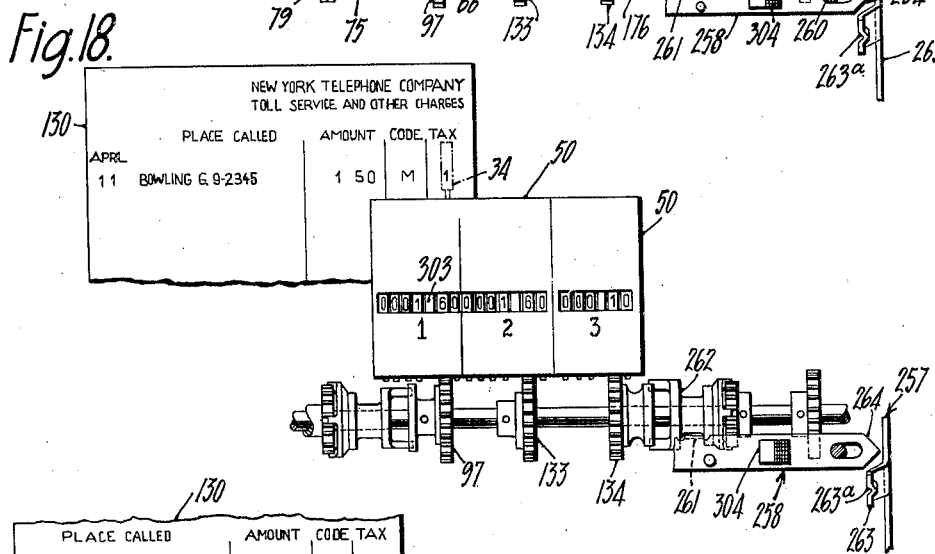
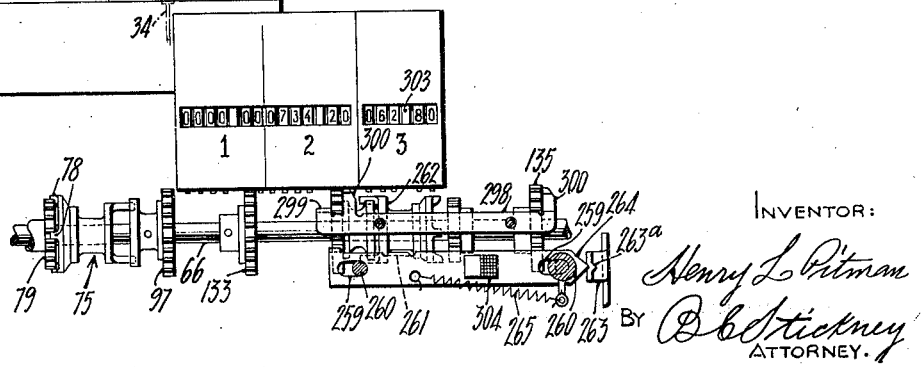
INVENTOR:
Henry L. Pitman
BY D. C. Stickney
ATTORNEY.

Dec. 17, 1940.                H. L. PITMAN                2,225,484
               COMBINED TYPEWRITING AND COMPUTING MACHINE
                  Filed Oct. 16, 1936          11 Sheets-Sheet 11
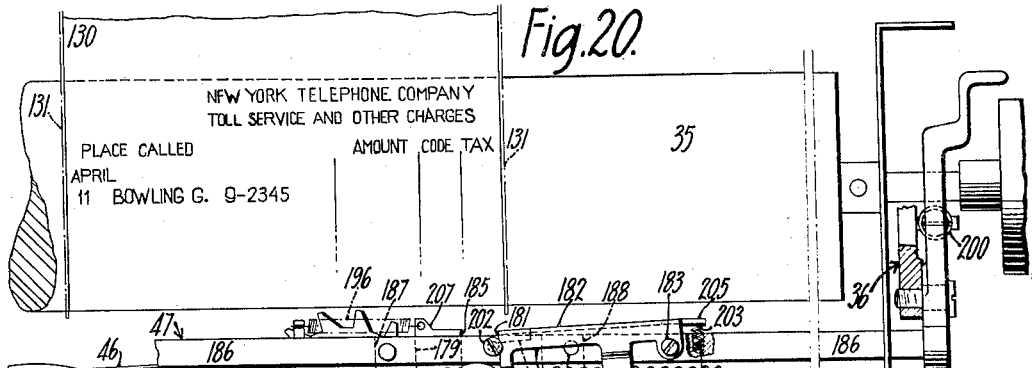
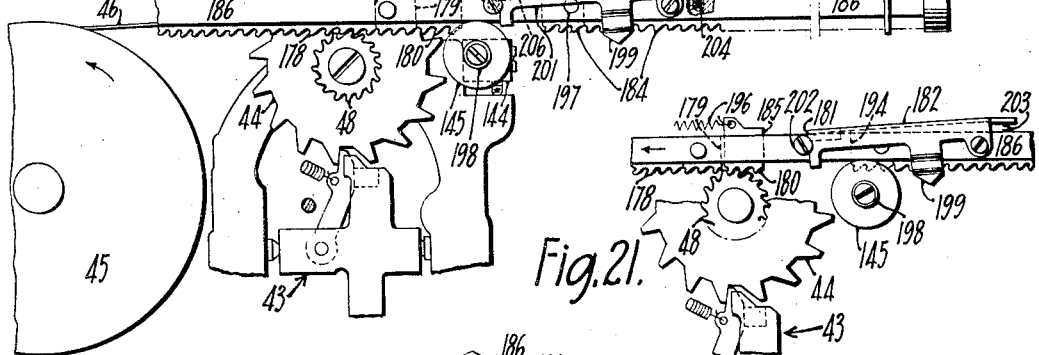
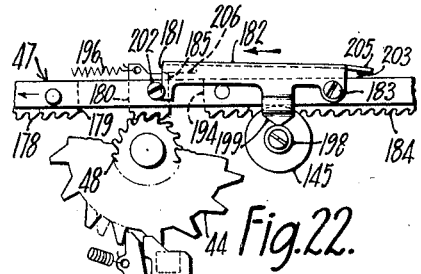
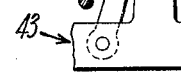
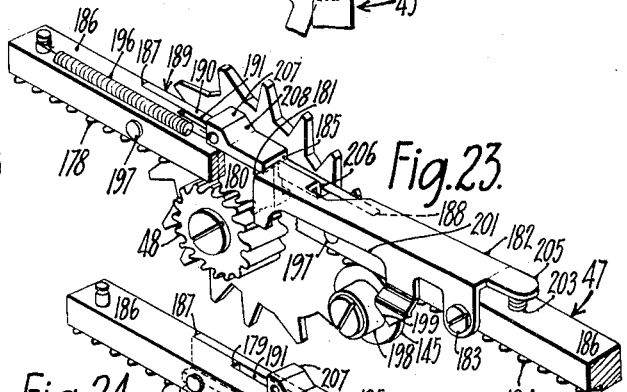
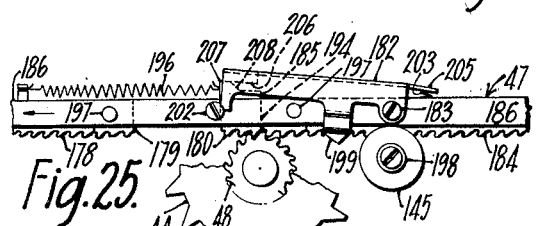
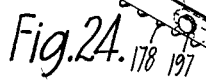
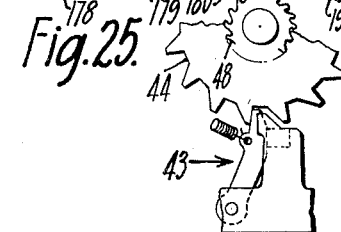
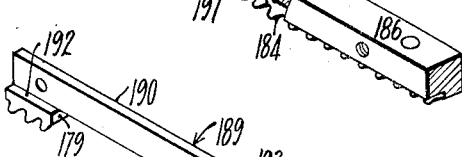
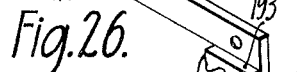
INVENTOR:
Henry L. Pitman
BY B. C. Stickney
ATTORNEY Patented Dec. 17, 1940

2,225,484

UNITED STATES PATENT OFFICE 2,225,484

COMBINED TYPEWRITING AND COMPUTING MACHINE

Henry L. Pitman, Hartford, Conn., assignor to Underwood Elliott Fisher Company, New York, N. Y., a corporation of Delaware Application October 16, 1936, Serial No. 105,882

3 Claims. (Cl. 235—59)

This invention relates to combined typewriting and computing machines in which digit-type keys control digital operation of a master-wheel mechanism, and a carriage, feeding step by step concomitantly with operation of said keys, brings totalizer-wheels seriatim into engagement with said master-wheel mechanism. A machine of this class is exemplified in Patent 2,020,340, to O. Thieme, issued November 12, 1935, and Patent 1,835,165, to A. G. F. Kurowski, issued December 8, 1931.

The invention deals particularly with improvements in means whereby a plurality of master wheels and a plurality of registers are coordinated during the typing of a line which may contain both computed and non-computed items or data.

The machine herein disclosed is particularly devised for doing the work, for example, of typing and computing telephone-toll bills. The form of such bill (illustrated in Figure 19) provides for entry of non-computed items, namely, the date and the telephone exchange and number of a call in the first column at the left of the bill. Three succeeding columns of the bill are respectively for the toll-amount, a code-symbol, and the Government tax, each call being thus itemized in one line across the bill; and the bill may include several such lines for different calls. Incidentally to the typing of the bills, the master wheels and registers are coordinated to compute the total toll and tax charges to the customer on each bill, a grand total of all the toll and tax charges on a multiplicity of bills, and a grand total of all the taxes alone entered on said bills.

In such case, three registers are provided, one for the total of a single bill and the other two registers respectively for said grand total of all the charges and said grand total of all the taxes for said multiplicity of bills. Three master wheels are used in different combinations with said registers to enter said totals in said registers and to clear the single-bill total register; and a fourth master wheel is used to clear the two grand total registers individually. It will be understood that for the register-clearing operations, the master-wheel mechanism is first conditioned for reverse, that is, subtractive rotation of the master wheels.

The several master wheels and several registers are respectively grouped closely together consonantly with doing all the typing, including the grand total typing, within the relatively narrow width of the bill; and it results that register-mechanism which is not to be operated while typing one part of a line of the bill will nevertheless traverse one or more of the master wheels.

Novel means are provided whereby the inappositely traversed master wheels are silenced or rendered inoperable relatively to the digit-type keys. Said means include devices whereby all the master wheels may be silenced collectively, as for instance, when typing the date and telephone-exchange numerals in the aforementioned telephone-toll bill; and said means also include devices whereby a given inappositely traversed master wheel is silenced individually consonantly with using another master wheel for computing.

An object of the invention is to work the master-wheel-silencing means, and also subtraction-setting means, automatically by means of the carriage, and particularly by tappet-devices that are apart from the register-structure, so that no tappet-reaction may tend to throw the registers out of true relatively to the master-wheel mechanism. Therefore the requisite tappets are placed on a rack that is mounted on the carriage apart from the usual register-supporting truck that travels with the carriage, a further feature residing in making use of the usual tabulating-stop rack at the back of the carriage for mounting such tappets. Novel master-wheel-mechanism-silencing and subtraction-setting trains extend forwardly, from the vicinity of the path traversed by said tappets, to the master-wheel mechanism at the front of the typewriter.

In the zone wherein the carriage normally operates to silence a master wheel, it may be desired on occasion to render said master wheel effective. A further object of the invention, therefore, is provision of a key operable at will, and means enabling said key to counter or negative the master-wheel silencing that is normally effected by the carriage; and a feature of such provision resides in having said key at the typewriter-keyboard so that it may be worked without moving the hands from the keyboard.

A further object of the invention is to adapt said key and means to negative the aforementioned collective silencing, by the carriage, of all the master wheels. In such case, although the master wheel whose use is desired is rendered effective by means of said key, another master wheel whose use is not desired is also rendered effective; and it is a further object of the invention to provide means enabling said key as it negatives the collective silencing, by the carriage, of the master wheels, to concomitantly re-silence only the undesired master wheel.

A further object of the invention is to provide means enabling said key to condition the master-wheel mechanism for reverse or subtractive rotation of the master wheel that has been rendered effective by means of said key.

A tabulating mechanism is operable to release the carriage and project a stop for resulting tabulating advance of the carriage to a given zone.

It is a further object of the invention to provide means whereby some or all of the aforementioned controls of the master-wheel mechanism that can be effected by operation of the aforesaid key may be effected, on appropriate occasion, concomitantly with the operation of said tabulating mechanism, thereby to dispense with a separate operation of said key in order to still further save time and labor in the operation of the machine. For example, if the carriage be advanced by operation of said tabulating mechanism to a zone in which the carriage normally silences all the master wheels collectively, said last-mentioned means provide that there will occur, concomitantly with said tabulating operation, the negativing of the collective silencing, by the carriage, of the master wheels; the aforementioned re-silencing of a master wheel may also occur concomitantly with operation of the tabulating mechanism; and the conditioning of the mechanism for subtractive rotation of the effective master wheel may also occur concomitantly with operation of the tabulating mechanism.

The tabulating mechanism may include two key-controls including tabulating keys at the typewriter-keyboard; the invention further making provision whereby one tabulating key is effective only to tabulate the carriage, and the other tabulating key is effective to tabulate the carriage and concomitantly control the master-wheel mechanism as aforesaid. In the illustrated machine, the two tabulating-key controls are embodied in a set of denominational tabulating keys, in that one or more of the latter may be effective only to tabulate the carriage, and another denominational tabulating key is effective to tabulate the carriage and concomitantly control the master-wheel mechanism. For example, when the carriage is tabulated to a zone in which it is desired to negative the silencing, by the carriage, of the master-wheel mechanism normally occurring at said zone, the tabulating is effected by operation of one of the higher denominational tabulating keys consonantly with writing a total at said zone and clearing the corresponding register. Thus, it would occur only at operation of one of said higher denominational tabulating keys that the carriage would be tabulated and the master-wheel mechanism concomitantly controlled as aforesaid, the lower denominational tabulating key or keys being only effective to tabulate the carriage.

Consonantly with pressing said keys only momentarily, so that the operator's hands may thereafter be free for typing, the condition of the master-wheel mechanism, for a given zone, effected by means of said keys becomes set; and a further object of the invention is to provide means whereby, following the employment of said condition, a movement of the carriage, as, for example, the carriage-return movement, automatically causes restoration of the master-wheel mechanism.

The invention also provides improvements relative to the letter-feed carriage-rack, whereby the carriage may be automatically caused to jump one or more letter-spaces from the end letter-space of one column or zone to the first letter-space of a succeeding zone, a device of this kind being particularly useful in facilitating the writing of the aforementioned telephone-bill. The improvements in this respect reside in enabling the carriage to make successive jumps by means of a single rack-segment that is automatically caused to shift repeatedly, for said successive jumps, relative to the main letter-feed rack with which said rack-segment is incorporated.

Other features and advantages will hereinafter appear.

In the accompanying drawings,

Figure 6 is a fragmentary front elevation of devices whereby when a register is at a punctuation-space the digit-type keys are locked.

Figure 7 is a sectional side view showing the Figure 6 parts and their relation to a master-wheel main clutch-train.

Figure 8 is a perspective of the exterior of the master-wheel mechanism, and also shows connections from a supplemental or palm tabulating key to the tabulating mechanism.

Figure 9 is a perspective of the means, including a clutch, whereby a given master wheel may be silenced individually, while another master wheel remains effective.

Figure 10 is a side elevation of the parts involved in the operation of the key to negative the silencing, by the carriage, of the master-wheel mechanism.

Figure 11 is similar to Figure 10, showing further the operation of the means whereby a given master wheel is re-silenced individually and the master-wheel mechanism is set for subtraction concomitantly with operation of the key. Figure 11 also shows means enabling the carriage to individually silence said given master wheel.

Figure 12 is a diagram of the telephone-bill, the registers and the master wheels, and represents the latter relative to the registers for typing a grand total of the taxes.

Figure 13 is similar to Figure 11 in that it shows the same mechanism that was actuated by the aforesaid key actuated, instead, by depression of a tabulating key.

Figure 14 is similar to Figure 12, and represents the relative positions of the master wheels and the registers for typing a grand total of all the charges.

Figure 15 is a side elevation showing how the carriage operates to restore the subtraction-setting and master-wheel-silencing controls.

Figure 16 is a front elevation showing the carriage-tappet and the master-wheel-silencing train-terminal in their relative positions at the extreme of the carriage-return movement and at the end of the usual carriage-return drop-back following said return movement.

Figures 17, 18 and 19 are similar to Figure 12; Figure 17 showing the relative positions of the master wheels and registers for a total charge or amount entry in two of the registers; Figure 18 showing the relative positions for entering a tax in each of the three registers simultaneously, and Figure 19 showing the relative positions for clearing the amount-register concomitantly with copying the total of a single bill therefrom.

Figure 20 is a front elevation representing the platen-carriage, and the letter-feed mechanism including the novel devices associated with the letter-feed rack for automatically jumping the carriage to skip a plurality of letter-spaces.

Figure 21 is a diagram representing the feed-rack segment engaging the letter-feed pinion and the main rack as having just left said pinion for an ensuing carriage-jump.

Figure 22, similar to Figure 21, shows the carriage-jump-limiting stop being displaced at a letter-feed step of the carriage to release the rack-segment for an ensuing second carriage-jump.

Figure 23 is a perspective showing the stop in position against the rack-segment to limit the first carriage-jump.

Figure 24 is a perspective of the main rack and rack-segment, parts being broken away and sectioned to show construction.

Figure 25 is a view companion to Figure 22, showing the relative positions of the parts following completion of the second carriage-jump.

Figure 26 is a perspective of a part of the feed-rack.

Figure 1:
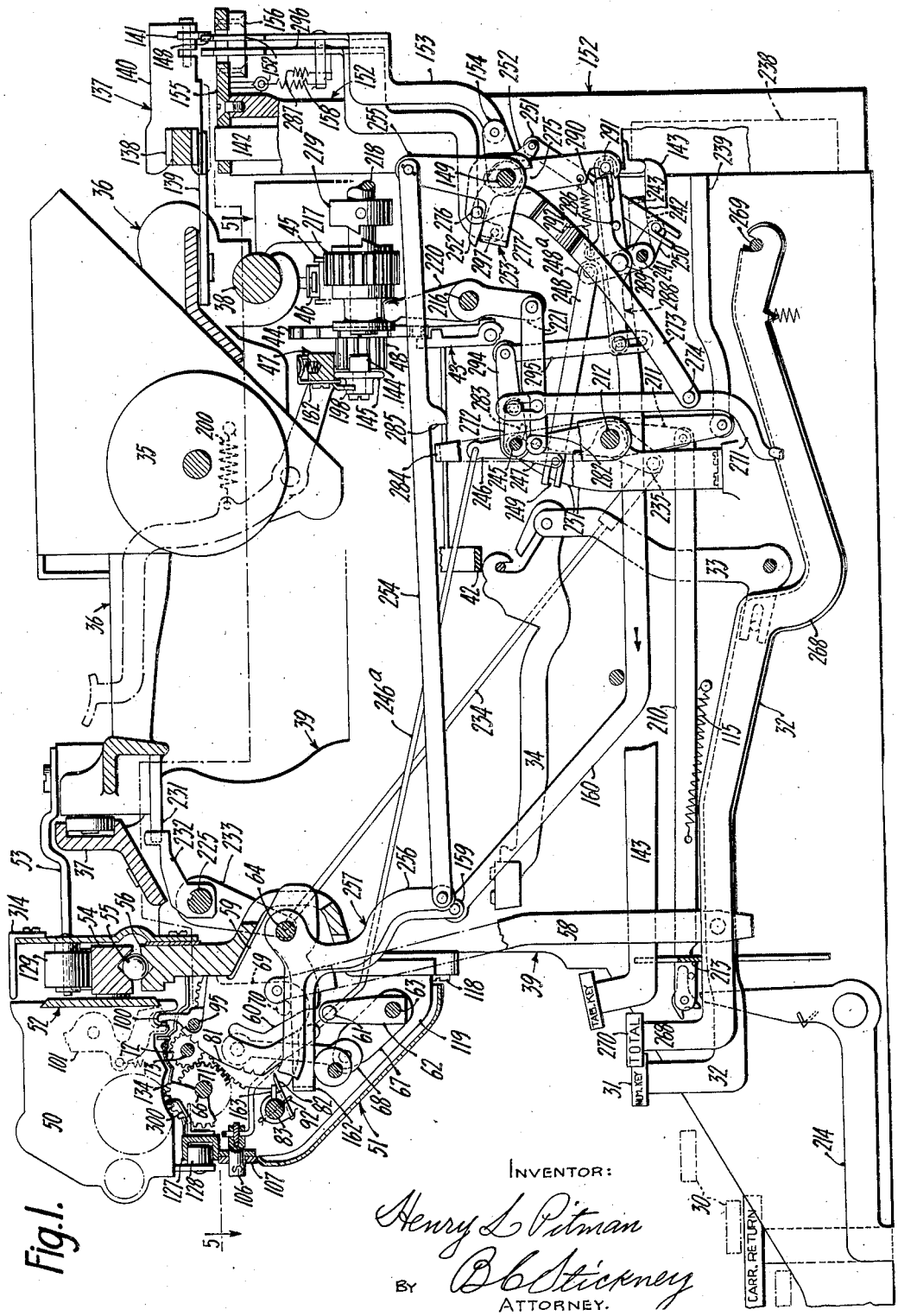
Figure 1 is a sectional side elevation of the computing typewriter, showing the register-mechanism, the type-key-operated master-wheel mechanism, and the devices whereby the carriage and the aforesaid key and tabulating keys control the condition of the master-wheel mechanism.

In an Underwood computing typewriter, the type-action system, Figure 1, includes alphabet-keys 30 and numeral or digit keys 31, each key being on a key-lever 32, connected by a bell-crank 33 to a type-bar 34, swingable from a normally cumbent position to print against a platen 35 mounted in a carriage 36 running on front and rear rails 37, 38, on the machine-frame 39.

Each type-bar 34 coacts with the usual universal bar 42 to actuate a dog-rocker 43, Figures 1 and 20, relatively to an escapement-wheel 44 for a resulting letter-feed step of the carriage 36; said carriage being driven by means of the usual spring 45 and drawband 46, and having a feed-rack 47 engaging a pinion 48 connected to said escapement-wheel 44. Novel devices associated with said feed-rack 47 for letter-space skipping will be described later herein.

Figure 3:
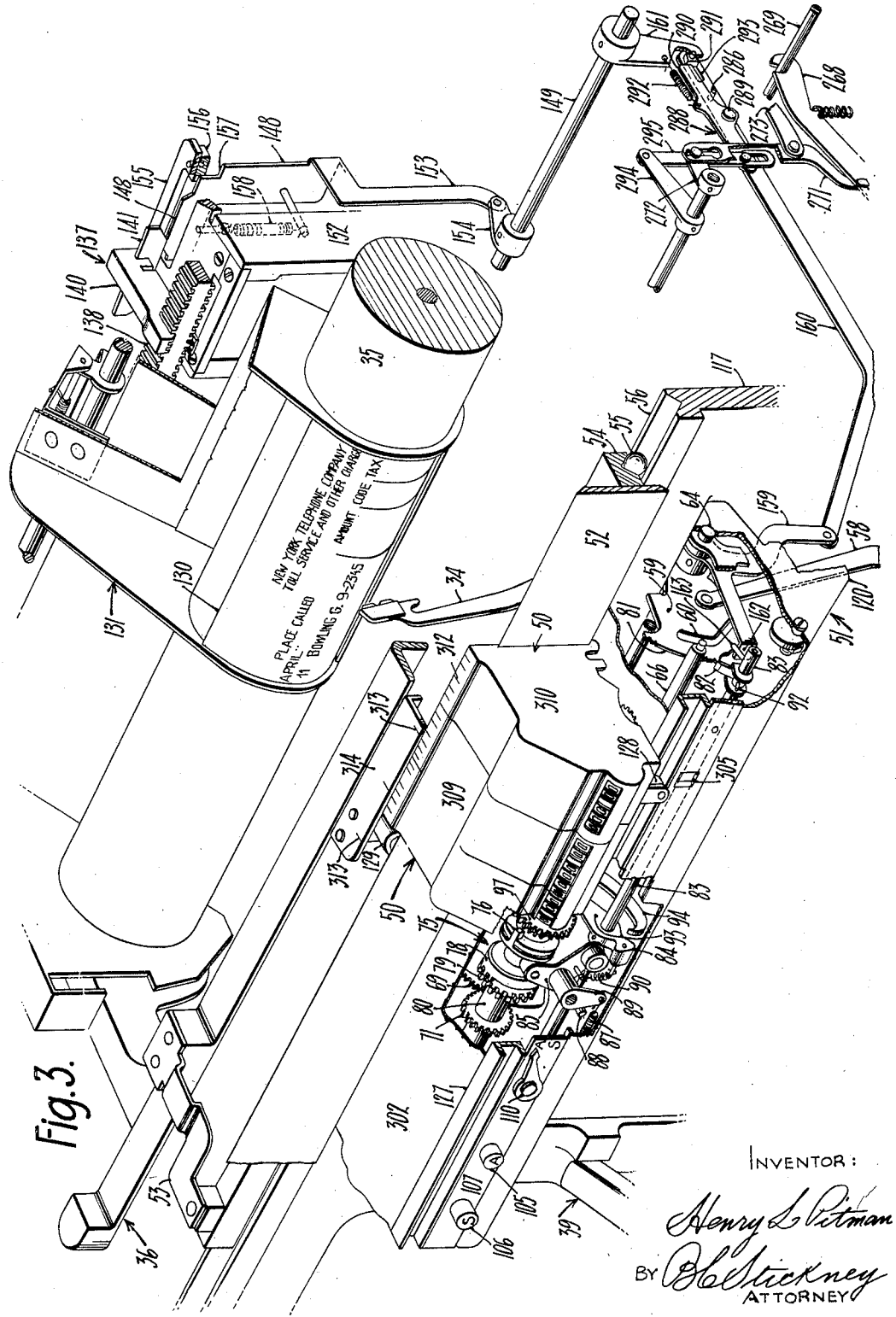
Figure 3 is a perspective showing the carriage, registers, master-wheel mechanism and the novel means enabling the carriage to silence all of the master wheels; a portion of the key and the means operable thereby to negative said silencing also being shown.

Computing registers 50, Figures 1 and 3, travel with the carriage 36 to traverse register-operating master-wheel mechanism 51; said registers 50 being mounted on a truck 52 connected to the carriage 36 by ties 53, and said truck having a guide-rail 54 which runs upon anti-friction rolls 55 along a stationary guide-rail 56.

At its depression, the numeral-key lever 32 works through a link 58 to rock an actuator 59, Figure 1, in the master-wheel mechanism 51, so that an actuator-cam 60 engaging a follower 61 of an arm 62 of a rock-shaft 63 rocks the latter an angular extent corresponding to the key-lever digit-value. There are a link 58, an actuator 59 and an arm 62 for each numeral-key lever 32; the several cams 60 being proportioned differentially according to the digit-values, and the actuators 59 being rotatable individually on a common fulcrum-rod 64.

The differential or digital movements of said rock-shaft 63 are transmitted to a master-wheel shaft 66, Figures 1, 2, 3 and 5, by means of an arm 67, on said rock-shaft 63, a gear-sector 69 fulcrumed on a rod 70, a link 68 connecting said arm 67 and said gear-sector 69, and a master pinion 71 normally rotatably loose on said master-wheel shaft 66. Said master pinion 71 is driveable either directly by said sector 69 for additive rotation of the master-wheel shaft 66, or through a change-gear 72, placeable, as will be described later, between said master pinion 71 and sector 69 for reverse or subtractive rotation, said change-gear running on an axle-rod 73.

Figure 2:
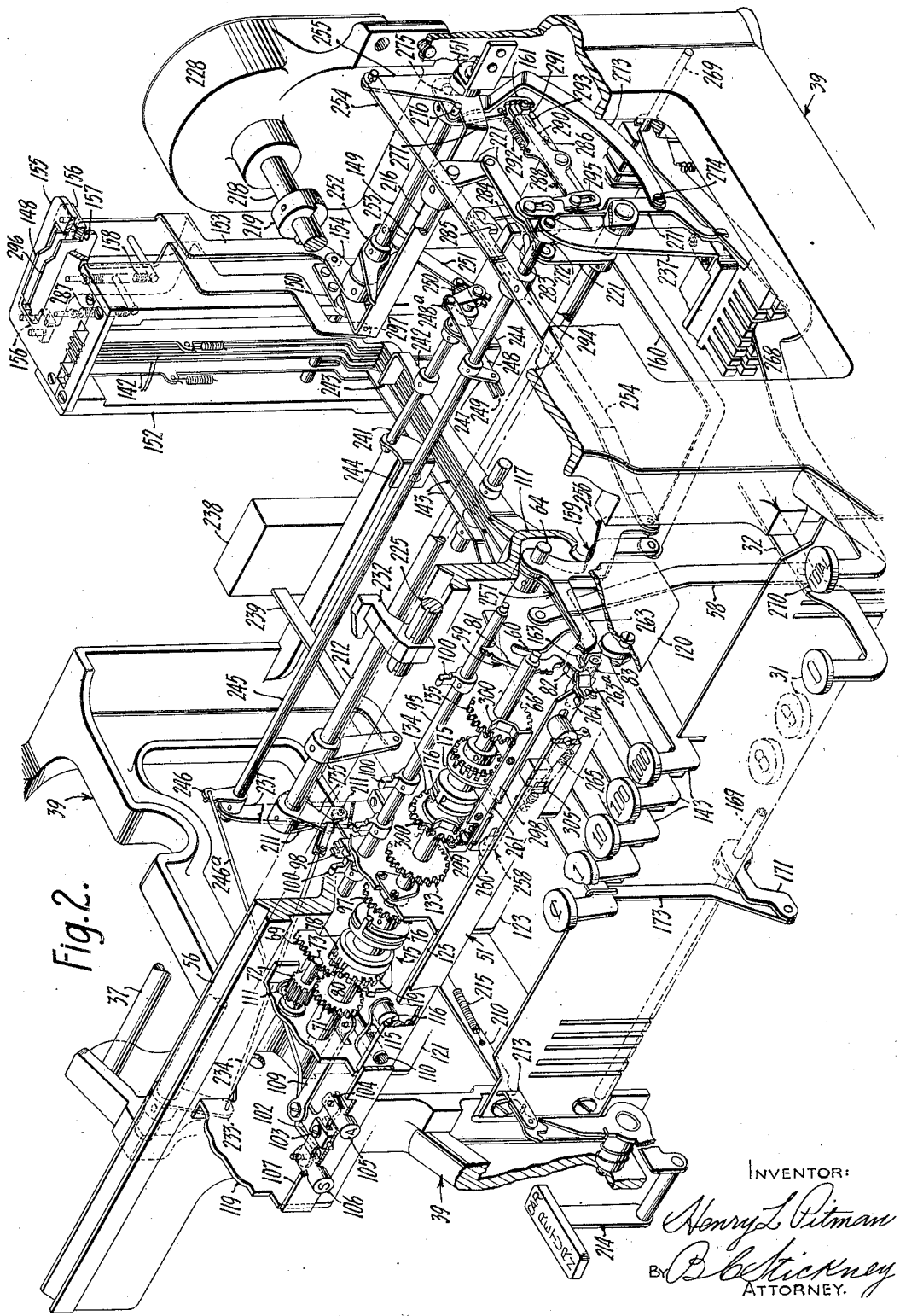
Figure 2 is a perspective of the computing typewriter to bring out details of the devices seen in Figure 1, parts of the machine being omitted, as, for example, the carriage, and other parts being shown broken away or sectioned for clarity.
Figures 4, 5:
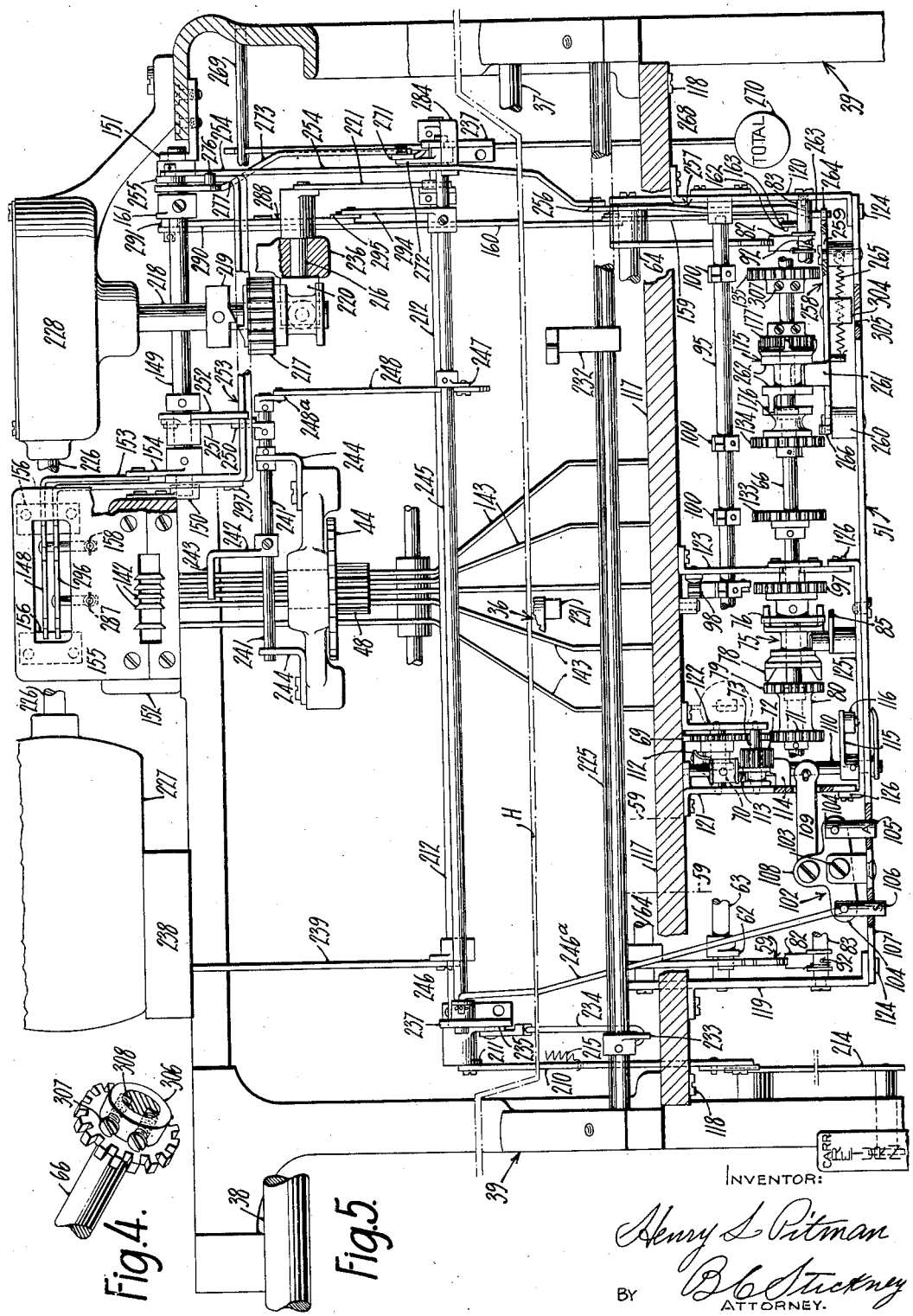
Figure 4 is a perspective of a master wheel and a device for angularly adjusting same on its shaft.
Figure 5 is a sectional top plan of the typewriter, showing details of the master-wheel mechanism and the devices, of Figure 1, for controlling same, the carriage being omitted, and the view being that of a section taken approximately on the trace 5—5, of Figure 1, and shortened as represented by the gap H in said Figure 5.

A clutch 75 is splined at 76 to the master-wheel shaft 66, and is normally positioned, Figures 2, 3 and 5, so that clutch-teeth 78 thereon are clear of a toothed-clutch disk 79, joined, by a hub 80, to said master pinion 71.

During the initial portion of the down stroke of an actuator 59, before its cam 60 works the rock-shaft 63, an edge 81 of said actuator 59 (Figures 1 and 2) displaces a companion pawl 82 downwardly to actuator-trailing position to rock a clutch-controlling rock-shaft 83 which mounts the several pawls 82. It results that an arm 84, Figures 3 and 7, on said rock-shaft 83, works a clutch-shifter or bell-crank 85, pivoted in the master-wheel-mechanism framework, to shift the clutch 75 leftward to engage the master-pinion-clutch disk 79, thereby enabling the thereafter starting rotation of the master pinion 71 to drive the master-wheel shaft 66.

When the master-wheel-shaft rotation has been completed by means of the cam 60, and before the end of the actuator down stroke, the trailing pawl 82 escapes from the actuator-edge 81, whereupon a spring 87, Figures 3 and 7, pulling on an arm 89, connected to the bell-crank 85, turns the latter clockwise against a stop 88, and thereby shifts the clutch 75 rightward again to disconnect the master pinion 71 from the master-wheel shaft 66, the clutch-controlling rock-shaft 83 being concomitantly restored to normal position. Thus the master-wheel shaft 66 is not driven reversely at the return movement of the actuator 59 and master pinion 71.

In the return movement of the actuator 59, its edge 81 lifts the escaped pawl 82 to reverse actuator-trailing position, while the clutch-controlling rock-shaft 83 is held stationary in its normal position by a spring 90, Figures 3 and 7, extending from the rock-shaft arm 84 to the bell-crank 85; each pawl 82 being rotatable individually relatively to said rock-shaft 83. When the actuator 59 reaches the end of its return stroke, the pawl 82 will have escaped downwardly from the actuator-edge 81 and will have been returned by its individual spring 91 against a stop-pin 92 in said rock-shaft 83. The individually spring-pressed pawls 82 and their capability of moving to reverse actuator-trailing positions relative to the rock-shaft 83, so as to be also operative for preventing simultaneous operation of two numeral-key levers 32 at computing, are substantially as disclosed in my application Serial No. 646,953, filed December 13, 1932, now Patent No. 2,118,861.

In the initial portion of the down stroke of the actuator 59 accompanied by rocking of the clutch-controlling shaft 83 to connect the master-wheel shaft 66 for rotation, an arm 93 of said rock-shaft 83 works against a cam-arm 94, Figure 7, to rock the latter and its rock-shaft 95 counterclockwise, said shaft 95 being journaled in the master-wheel-mechanism framework. This withdraws a locking dog 96 from a master wheel 97, fastened to the master-wheel shaft 66; it also causes a dog 98 to engage a rack 99 on the register-truck 52 to lock the latter laterally; and it also causes a dog 100 to rock the appropriate denominational lever 101 which forms part of the register-carry-over mechanism as described in the aforesaid Thieme patent. Said dogs 96, 98, 100 are shown combined with said cam-arm 94.

For manually setting the master-wheel mechanism for addition or subtraction, at will, there is used mechanism substantially as disclosed in the application, Serial No. 553,937, of O. Thieme, filed July 30, 1931, now Patent No. 2,115,922. In said mechanism, a three-armed state-setting lever 102, Figures 2 and 5, is pivoted to the master-wheel-mechanism framework at 103, and has opposite arms 104, from which an adding key 105 and a subtraction-key 106 extend forwardly and are guided in a front cross-bar 107 of said framework. A third arm 108 is connected by link 109 to a rock-shaft 110, journaled in said framework to extend rearwardly from said link to present an upwardly-extending arm 111 and a downwardly-extending arm 112, articulated respectively as at 113, Figure 5, to the change-gear 72 and to the sector 69. Said change-gear 72 and sector 69 are slidable laterally on their respective journaling rods 73, 70.

With the adding-key plunger 105 pushed in, Figure 5, the gear-shift arms 112, 111 respectively present the sector 69 in direct engagement with the master pinion 71, and the change-gear 72 disengaged from both the sector 69 and master pinion 71. Conversely, upon pushing in the subtraction-key plunger 106, said gear-shift arms 112, 111 will have shifted the sector 69 to the left and the change-gear 72 to the right to positions enabling said sector 69 to drive the master pinion 71 reversely through said change-gear 72. In its shift to the right, said change-gear 72 becomes disengaged from a detent-tongue 114, designed as shown in said Kurowski patent, to keep the sector 69, master pinion 71 and change-gear 72 in proper relative angular positions, to prevent clashing of their teeth during the shifts. A detent-arm 115 on the rock-shaft 110 engages the framework as at 116, Figures 2 and 5, to yieldably keep the parts in addition or subtraction positions.

The master-wheel-mechanism framework includes a back 117, Figure 5, fastened to the typewriter-frame 39 by screws 118. End bracket-plates 119, 120, and intermediate bracket-plates 121, 122, 123 project forwardly from said back 117, Figures 2 and 5, the intermediate bracket-plate 122 not being shown in Figure 5. The cross-bar 107 is joined to the end plates 119, 120, as at 124, Figure 5, and is also supported by attachment to a cross-bar 125 joined to the intermediate plates 121, 123, as at 126. The actuator-driven rock-shaft 63, the actuator-fulcrum rod 64, and the clutch-control shaft 83 are supported in the end plates 119, 120. The intermediate plates 121, 122 support the sector and change-gear rod 70, 73; and the plate 123 and end plate 120 support the dog-rock-shaft 95. Said framework also includes a cross-rail 127 engaged by a roller 128, Figure 1, depending from each register-mechanism 50 to support the latter against upward thrust. The typewriter main frame 39 also mounts a hold-down roller 129 over the register-truck rail 54.

The mechanism so far described operates substantially as set forth in the aforesaid patents and applications. The novel devices for using and coordinating a plurality of master wheels and a plurality of registers will now be described with reference, for example, to typing and computing telephone-toll bills.

The bill-form 130 herein represented may be an individual sheet or one of successive forms of a continuous web, and is rear inserted around the platen 35 within a paper-chute 131, Figure 3, so that, with the typewriter-carriage 36 initially positioned by means of the line-start-defining margin-stop (not shown), the bill 130 will be laterally positioned for typing the first character in the first column of the bill. In said first column the day of the month of a call is written, followed by the telephone-exchange and number of the call. Then, in the three succeeding columns, there are respectively typed the toll-charge or "amount" of the call, a code-letter, symbolizing the nature of the call, and the tax on the call; each call having its individual line on the bill as shown in Figure 19.

In typing the amounts and taxes of several calls, three totals are accumulated, and there are therefore provided three registers 50, respectively designated as No. 1, No. 2 and No. 3, in Figures 3, 12, 14, 17, 18 and 19. Register No. 1 accumulates the total of the tolls and taxes of a single bill; register No. 2 the grand total of the tolls and taxes of a multiplicity or collection of bills known as a book; and register No. 3 accumulates the total of all the taxes on the collection or book of bills. Thus, when typing the toll-charge of a call in the second or amount column of the bill, said toll-charge is concomitantly entered in registers Nos. 1 and 2, and therefore register No. 1 traverses a master wheel 133, while at the same time, see Figure 17, register No. 2 traverses a master wheel 134; these master wheels 133, 134 being provided on the master-wheel shaft 66 additionally to the master wheel 97 that was mentioned hereinbefore with reference to its engagement by the master-wheel-locking dog 96. After typing the code-letter in the third column of the bill, said master wheel 97 comes into use when typing the tax in the fourth bill-column, in that it is traversed by register No. 1 to add the tax to the toll-charge previously entered in register No. 1. Simultaneously with thus entering the tax in register No. 1, said tax is also added in the No. 2 register and in the No. 3 register, these latter registers for this purpose traversing the master wheels 133, 134, as represented in Figure 18.

A fourth master wheel 135 is located on the master-wheel shaft 66, so as to be traversed in turn by the No. 2 and No. 3 registers while the carriage traverses the first bill-column zone, the grand totals of these registers being typed in said zone at the end of a book, as represented in Figures 12 and 14, and these registers, No. 2 and No. 3, being concomitantly cleared as will be explained later. There is a companion master dog 100 for each master wheel 97, 133, 134, 135.

It will be seen now that, consonantly with doing the described typing and computing within the short range of carriage-travel that is commensurate with the narrow width of the bill, the fourth master wheel 135 will be traversed by registers No. 1 and No. 2 when typing the day of the month and telephone-exchange numerals, and that it is only on the comparatively infrequent occasions of typing said grand total that said fourth master wheel 135 is to be operative. Said fourth master wheel 135 is therefore normally caused to be silenced while the carriage 36 is traversing the first column-zone, and, for this purpose, the master-wheel shaft 66 itself is silenced, since it is also desired that none of the other master wheels 97, 133, 134 shall be operative while typing at said first column-zone for the several calls.

Mechanism for normally silencing the master wheels is worked by a tappet-unit 137 placed on the usual tabulating rack 138, mounted on brackets 139 extending rearwardly from the typewriter-carriage 36. Denominational tabulating counterstops 142 are selectively projected by denominational tabulating-key levers 143 for engaging a tabulating stop on said rack 138 to arrest the tabulating-carriage advance, the carriage having been released concomitantly with projection of the counter-stop 142. Suitable carriage-releasing means, for tabulating, are represented by the partly shown lever 144 and its roll 145, Figure 1, for raising the carriage-feed rack 47 from the escapement-pinion 48, and are exemplified in Patent No. 1,858,447, to Helmond, issued May 17, 1932.

Said tappet-unit 137 includes a block 140 forked for placement upon said tabulating rack 138, said block 140 presenting a tappet 141, Figures 1 and 16. In the initial line-starting position of carriage 36, said tappet 141 has depressed a jack, in the form of a cam-plate 148, to rock a shaft 149, journaled in brackets 150, 151, Figures 2 and 5, attached to the usual tabulating-counter-stop housing 152 and to the frame 39; said cam-plate 148 having a stem 153 connected to arm 154 on said shaft 149. A plate 155 on said housing 152 has cam-plate guides 156; and cam-plate shoulders 157 normally stop against said guides 156 for the normal raised position, Figure 2, to which said cam-plate 148 is urged by a spring 158.

The described depression of the cam-plate 148 and rocking of the shaft 149, by means of a carriage-tappet 141, operate through a bell-crank 159, fulcrumed on the actuator-fulcrum shaft 64 in the master-wheel mechanism 51 and connected by a link 160 to an arm 161 of said shaft 149, to rock the master-wheel-clutch-controlling rock-shaft 83 counterclockwise to turn its pawls 82 out of the path of the actuators 59, as in Figure 3, said bell-crank 159 having a side spur 162 to engage an arm or pin 163 of said rock-shaft 83. This renders said numeral-key-lever-driven actuators 59 ineffective to work the clutch 75 for connecting the actuator-driven master pinion 71 to the master-wheel shaft 66, and thereby silences the latter and all its master wheels 97, 133, 134, 135, at operation of the numeral-key levers 32 in the first bill-column zone; the tappet 141 and the cam-plate 148 being elongated as represented in Figure 3 commensurately with keeping the cam-plate 148 depressed throughout the traverse of said first column-zone by the carriage.

The turning of said clutch-controlling rock-shaft 83 to disabled position, Figure 3, causes its arm 84 to recede from the clutch-shifter or bell-crank 85, and stretch the spring 90. Said spring 90 thereby becomes effective for rocking said clutch-controlling rock-shaft 83 back to normal position, Figure 2, when the rock-shaft-disabling bell-crank 159 is caused to rock back to its normal position, Figure 2, concomitantly with restoration of the cam-plate 148, by its spring 158, when the carriage-tappet 141 clears said cam-plate 148 at the end of the first column-zone.

The day of the month and the telephone-number of a call having been typed in the first column of the bill 130, the carriage may be advanced to the amount-column by operating the tabulating mechanism. For facilitating the tabulating operation, the machine is shown (Figure 8) equipped with a palm-key-tabulating lever 165, pivoted at 164 to the side of the typewriter-frame.

In the present machine, depression of said palm-key-tabulating lever 165 depresses the tens-of-cents denomination tabulating key 143 in consideration of the first digit of the toll for most calls being in the tens-of-cents denomination designated by the character ¢ on such key 143 in the present machine. The connections include an intermediate lever 166, pivoted to the typewriter-frame at 167, and connected to the palm-key-tabulating lever 165 at 168, and a rock-shaft 169, journaled in the typewriter-frame 39, having arms 170, 171, connected respectively to said intermediate lever 166 at 172, and by a link 173 to the tens-of-cents-denomination key-lever 143.

While the carriage 36 transverses the amount-column zone concomitantly with typing the toll-charge in the amount-column of the bill 130, registers No. 1 and No. 2 respectively traverse, see Figure 17, the master wheels 133 and 134, so that the toll-charge will be added in each of these latter registers. It may be explained here that the master wheels 97, 133 and 135 are shown permanently connected to the master-wheel shaft 66, to always rotate therewith, and that the master wheel 134 is normally connected to said master-wheel shaft 66 by a clutch 175, Figure 5, splined to said master wheel 134 at 176, said clutch 175 normally engaging a toothed clutch-head 177 on said master-wheel shaft 66, as in Figures 5 and 17, and being laterally shiftable to the left for its disengagement from said clutch-head 177 for silencing said master wheel 134 individually as will be explained later.

As the carriage 36 moves concomitantly with the step of the escapement-wheel 44, which ensues upon typing the last digit of the toll-charge, a leading rack-portion 178 of the feed-rack 47, ending in a shoulder 179, leaves the escapement-pinion 48, as in Figure 21, and a feed-rack segment 180 normally abutting said shoulder 179, as in Figure 20, has meanwhile advanced into mesh with said escapement-pinion 48. It results that the carriage is drawn leftwardly by its spring 45 and drawband 46 until an end 181 on a stop-finger 182, pivoted at 183 to a trailing portion 184 of the rack 47, strikes, Figure 23, a stop-face 185 of the rack-segment 180, said rack-portions 178, 184 moving relatively to said rack-segment 180, which is held by the escapement-pinion 48. The carriage 36 thus is caused automatically to skip a number of spaces to bring it immediately, upon typing the last toll or amount digit, to the space for the code-letter in the code-column of the bill 130. The number of letter-spaces skipped (three in the present instance) is commensurate with said step of the escapement-wheel 44 plus the distance (Figure 20) that normally separates the rack-segment-stop face 185 and the stop-end 181 of the stop-finger 182.

A one-piece rack-bar 186 includes the leading rack-portion 178 up to a plane 187, Figures 20 and 24, and the trailing rack-portion 184 starting from a plane 188, said planes being formed as by milling said rack-bar 186 across its back and under side to receive an insert 189 shown separately in Figure 26. Said rack-bar 186 is further milled across its back to form, with a plate 190 of said insert 189, a slot 191 in which the rack-segment 180 is slidable relatively to the rack-bar 186. Bottom lugs 192, 193, at the ends of the insert 189, have rack-teeth, Figure 26, and respectively complete the leading and trailing rack-portions 178, 184. Said lugs 192, 193 include respectively a part of the aforesaid end-shoulder 179 of the leading rack-portion 178, and a part of a shoulder 194 at which the trailing rack-portion 184 starts, said shoulders being completed by the ends of the slot 191 in which the rack-segment 180 is retained. Said rack-segment 180 has back flanges 195 slidably fitting the top and bottom edges of the insert-plate 190, and a spring 196 normally keeps said rack-segment 180 in abutment with said end-shoulder 179 of the leading rack-portion 178, Figure 20. Rivets 197, Figure 24, secure said insert 189 to the rack-bar 186.

Since the symbol in the code-column is typed by means of an alphabet-type key 30, it will be seen that there is no concurrent actuation of the computing mechanism.

As the carriage 36 moves concomitantly with the step of the escapement-wheel 44, which ensues, Figure 22, upon typing the symbol in the code-column of the bill 130, a reduced end 198 of the feed-rack-raising roll 145 of the tabulating mechanism reacts against a cam 199 on the advancing stop-finger 182 to swing the latter upwardly relatively to the feed-rack 47, held down by means of the usual feed-rack spring 200, Figures 1 and 20, to release said finger 182 from the rack-segment 180, and said rack-segment 180 still remaining in engagement with the escapement-pinion 48 at the end of said step of the escapement-wheel 44, it results that the carriage jumps until the shoulder 194 of the trailing rack-portion 184 meets the stop-face 185 of said rack-segment 180, as in Figure 25. The carriage thus skips a number of letter-spaces to bring it immediately to the tens-of-cents denomination for the tax-column of the bill 130, the number of spaces skipped (three in the present instance) being commensurate with said step of the escapement-wheel 44 plus the distance from the end 181 of the stop-finger 182 to the shoulder 194 of the trailing rack-portion. A side flange 201 of the stop-finger 182 plays between the side of the rack-bar 186 and a screw-head 202 to steady said finger 182 sidewise at its free end, said finger 182 being pivoted at the other end of said flange 201. A spring 203 seated at 204 in said rack-bar 186 presses against a tongue 205 of said stop-finger 182 to yieldably keep the latter in its normal Figure 20 position. A tab 206 formed on said stop-finger 182 extends its stop-end area preferably downwardly and is therefore normally within the rack-segment-retaining slot 191, Figure 23. A lug 207 on the rack-segment 180 for the spring 196 is beveled at 208 to deflect the stop-finger 182, to permit the latter to freely override said lug during the described space-skipping advance of the carriage to the Figure 25 position.

The carriage having skipped, as explained, to the tens-of-cents denomination of the tax-column, the tax is now typed and is concomitantly entered into registers Nos. 1, 2 and 3; said registers at this time, Figure 18, traversing respectively the master wheels 97, 133, 134.

Following the typing of the last or units-of-cents digit of the tax, the carriage is returned to the usual line-start-defining margin-stop (not shown), and the platen is line-spaced for writing the statement of another call in a new line. For carriage-returning and line-spacing by power, there may be used mechanism of the kind described in my Patent 1,580,326, issued April 13, 1926. In such mechanism, a trip-link 210, connected to an arm 211 of a rock-shaft 212, is normally latched as at 213, Figures 1 and 2, to the typewriter-framework. A carriage-return-key lever 214 is manually operable to raise the forward end of said link 210, to release it for resulting rearward movement by a spring 215. This rocks said shaft 212 and another rock-shaft 216, Figures 1 and 5, to shift a carriage-return pinion 217 rearwardly on a pinion-shaft 218, to clutch it to the latter, by means of a clutch 219, said rock-shaft 216 having a pinion-shifting arm 220, and being connected by a linkage 221 to the first rock-shaft 212. Said pinion 217 meshes with the usual rack 222 on the carriage 36, Figure 15. For initiating a carriage-return automatically at the end of a line, said trip-link 210 may be released by the carriage working through the usual connections including, Figure 15, a trip-lever 223, connected by a link 224 to a carriage-operated bail 224ª, fulcrumed on a transverse shaft 225, along which the usual Underwood margin-stops are adjustable, the carriage working said bail 224ª through a lever on the line-end-defining margin-stop (not shown), as in Patent 1,238,919, to Hoyt, issued September 4, 1917.

A drive-shaft 226 from an electric motor 227, at the back of the typewriter, Figure 5, drives the carriage-return pinion-shaft 218, through a reduction-gear unit 228. For line-spacing at the carriage-return operation, the devices shown in my aforesaid Patent 1,580,326 may be used, said devices including, as represented in Figure 15, a vertical rock-shaft 229, fulcrumed in the carriage, and having an arm 230 engaged by said rack 222, said rock-shaft 229 being connected to the line-space mechanism, and said rack 222 having an initial limited movement, relatively to the carriage, which is used for line-spacing. As the carriage reaches the end of its return movement, a tappet 231 thereon engages a dog 232, splined to the shaft 225, to rock the latter, for disconnecting the pinion 217 from the clutch 219, said shaft 225 having an arm 233, Figures 1, 5 and 15, connected by a link 234 to an arm 235 of the rock-shaft 212 of the described pinion-shifting train. As said pinion 217 becomes thus disconnected, the trip-link 210 is thrust forwardly again, so as to become relatched, as at 213, when the carriage takes its usual drop-back movement, following termination of the carriage-return run. The pinion-shifting rock-shaft 216 is shown journaled in a bracket 236, Figure 5, on the framework, and the other pinion-shifting rock-shaft 212 is journaled in brackets 237 on said framework. The electric motor 227 is normally at rest, and is started and stopped for carriage-return operation by a switch contained in a casing 238 and controlled by a link 239 from the carriage-return pinion-shifting train.

It will be understood now that the described sequence of operations, namely, the printing of the date, telephone-exchange, amount, code and tax, and the return of the carriage and the line-spacing, is repeated for each call listed in its individual line on the bill. Following the typing of the last call-listing line of the bill and the return of the carriage, the bill is advanced, by rotating the platen, to bring the foot of the bill to the printing-line. This is for printing the total of the bill inclusive of all the toll-amounts and taxes as accumulated in register No. 1 at the foot of the amount-column of the bill, Figure 19. Concomitantly with printing said bill-total, said register No. 1 is cleared by means of the master wheel 133, which said No. 1 register traverses when typing the total in the amount-column, see Figure 19. Since at this time also the master wheel 134 is traversed by the No. 2 register, and it is desired to keep the grand total of all the bills in said No. 2 register, said master wheel 134 is individually unclutched from the master-wheel shaft 66 preparatory to printing said single bill-total. The master-wheel mechanism must also be set for subtraction preparatory to printing said bill-total.

The individual disconnection of the master wheel 134 and the subtraction-setting may be done concomitantly with the tabulating operation that is effected to bring the carriage to the amount-column, said carriage having been returned to line-start position following the typing for the last call on the bill. Since the total of the bill usually runs into the tens-of-dollars or higher denomination, the operation of a decimal-tabulating-key lever 143 of coresponding denomination, namely, tens of dollars or higher, may serve to individually disconnect said master wheel and set the master-wheel mechanism for subtraction.

Operations of tabulating-key levers 143 lower than the tens-of-dollars denominations are ineffective to effect disconnection of the master wheel 134 and subtraction-setting, in order that said lower tabulating-key levers may be used for positioning the carriage for typing the amounts and taxes of the individual calls, it being understood that the master wheels must rotate additively and the master wheel 134 must be effective at such typing of the individual amounts and taxes. In the present machine, three such higher denomination key-levers 143 are shown, namely, for the tens, hundreds and thousands of dollars denominations.

Referring now to Figures 1, 2, 5 and 13, the operation of any one of said higher-denomination-tabulating-key levers 143 rocks a shaft 241, the latter having an arm 242 provided with a universal spur 243 that reaches across said three higher tabulating-key levers 143, but not across the lower tabulating-key levers, as in Figures 2 and 5. Said shaft 241, journaled in brackets 244 of the machine-framework, is thus rocked counterclockwise to the Figure 13 position, and rocks a companion shaft 245, journaled in the brackets 237, clockwise to the Figure 13 position to turn the state-setting lever 102 from its adding, Figure 2, position, to subtracting position, said shaft 245 having an arm 246 connected by a pull-link 246ª to the subtraction-key side of said state-setting lever 102, and also having an arm 247 connected by a thrust-link 248 to an arm 248ª of said first rock-shaft 241. Upon releasing the tabulating-key lever 143, after its operation to tabulate the carriage, the detent-arm 115 in the master-wheel mechanism, Figure 2, keeps the state-setting lever 102 in subtractive position, and it will be remembered that in said position said lever 102 will have cooperated to shift the gear-sector 69 and change-gear 72 into subtractive relation to the master pinion 71. The subtraction-setting rock-shaft 245 also remains in operated position, Figure 13, until it is rotated back, as will be explained later, to reset the mechanism to addition. A pin-and-slot connection 249 at the thrust-link 248 enables said rock-shaft 245 to be set independently of the rock-shaft 241, and the latter may be restored, as by a suitable spring, not shown, independently concomitantly with release of an operated tabulating-key lever 143.

Disconnection of the master wheel 134 from the master-wheel shaft 66 concomitantly with operation of one of said higher-tabulating-key levers 143 is effected by means of said rock-shaft 241. To this end, an arm 250 of the latter is connected by a thrust-link 251 to a lever 252 loosely fulcrumed on the shaft 149 and serving as a one-way connection to a bail 253, that is also loosely fulcrumed on said shaft 149. A link 254 connects said bail 253, which has a link-arm 255, to an arm 256 of a bell-crank 257 loosely fulcrumed on the rod 64 in the master-wheel mechanism. Thus, when said rock-shaft 241 is rocked counterclockwise to the Figure 13 position by operation of one of said higher-denomination-tabulating-key levers 143, the bell-crank 257 displaces a clutch-shifter 258 to shift the clutch 175 for the master wheel 134 from the closed position, Figures 5 and 18, to the open position, Figure 19. Said shifter 258, in the form of a slide slotted as at 259, Figures 9 and 19, to slidably fit guide-studs 260 provided in the master-wheel-mechanism framework, has a tongue 261 fitting a groove 262 in said clutch 175 for connection to the latter. When the bell-crank 257 is rocked from the idle position, Figures 1 and 17, to the position Figures 13 and 19, an arm 263 thereon engages a cam-end 264 of the clutch-shifter 258 to displace the latter, and the clutch 175, leftwardly to the Figure 19 position, to thereby disconnect the master wheel 134 from the master-wheel shaft 66. A notch 263ª, Figure 18, in the bell-crank arm 263, seats the suitably pointed cam-end 264 of said shifter 258 to yieldably detent the latter and its described actuating train, from the bell-crank 253 to the bell-crank 257 in operated positions, Figures 3 and 19, a spring 265 coacting to thrust the shifter 258 into said notch 263ª. A spur 266 of the shifter 258 engages the master wheel 134 to dog the latter and its clutch 175 when said master wheel is disconnected as described, thereby providing against clashing of the clutch-teeth and against clashing of the master-wheel teeth and totalizer-gears.

The machine is also provided with a key-lever 268 operable for disconnecting the master wheel 134 and concomitantly effecting subtraction-setting, as, for example, when the bill-total does not run higher than the units-of-dollars denomination and no tabulating-key lever 143 higher than said latter denomination is used. To this end, said key-lever 268, fulcrumed on a rod 269 and having a total-key 270, is connected by a link 271 to an arm 272 of the subtraction-setting rock-shaft 245, thereby enabling said key-lever 268 to operate said rock-shaft 245. For concomitantly rocking the bail 253, to effect disconnection of the master wheel 134, a branch-link 273 is pivoted to said link 271, as at 274, and is forked, as at 275, over the shaft 149 for guidance, said link having a pin 276 engaging a side arm 277 of said bail 253.

The master wheel 134 having been silenced and subtraction-setting having been effected, either by operation of one of the higher-tabulating-key levers 143 or the total-key lever 268, the bill-total is now typed at the foot of the amount-column, as at Figure 19, and the No. 1 register from which said total is copied is concomitantly cleared. Another bill is then entered into the machine, and, preparatory to typing the first call-entry thereon, the carriage will have been returned to line-starting position.

It will be remembered that as the carriage reaches said position, the carriage-tappet 231 will have engaged the dog 232 to rock the shafts 225 and 212 for disengaging the carriage-return pinion 217, and restoring and relatching the carriage-return trip-link 210. Said tappet 231 and dog 232 are arranged to give an excess of rotation to said shafts 225 and 212, as is manifested by the overthrow of the trip-link 210 and the passing of its latching shoulder 279 beyond a latching plate 280, as at 281, Figure 15. This excess of rotation is used to reset the machine to addition and to effect reconnection of the master wheel 134. For this purpose, the linkage 221, connected to the rock-shaft 212, has a cam-shoulder 282 to engage a pin-arm 283, Figure 15, of the rock-shaft 245, to rotate the latter counterclockwise during said excess rotation, and thereby reset the machine to addition, it being remembered that said rock-shaft 245 is connected by the link 246a to the state-setting lever 102. Said rock-shaft 212 also has an arm 284, that, during said excess rotation, engages a shoulder 285 of the link 254 to displace the latter rearwardly, and thereby turn the bell-crank 257 counterclockwise to withdraw its arm 263 from the clutch-shifter 258, in consequence of which the latter and the clutch 175 are restored by the shifter-spring 265, and the master wheel 134 thus becomes clutched again to the master-wheel shaft 66.

Said tappet 231 and dog 232 are further arranged so that as the carriage takes the usual drop-back movement after striking the margin-stop, the tappet 231 recedes from said dog 232 to permit recovery of said shafts 225, 212 from said excess movement and consequent recession of the cam-shoulder 282 and arm 284, in order to permit later subtraction-setting operation of said rock-shaft 245, and forward thrust of the link 254 for disconnecting the master wheel 134. It will be seen that rotation, equivalent to said excess, of the rock-shafts 225, 212 occurs also if the carriage is returned manually, that is, even if the carriage is not returned by the carriage-return mechanism, and that therefore said manual return of the carriage will also be effective to effect resetting to addition and reconnection of the master-wheel 134.

When the typing of a multiplicity or "book" of bills is completed, the grand total thereof as accumulated in register No. 2, and the grand total of all the taxes alone of said bills as accumulated in register No. 3 are typed. Said grand totals may be typed for example in one line at the bottom of the last bill and under the first column thereof, as indicated at a and b, Figures 12 and 14.

It will be remembered that, since typing without computing, that is, typing of the date and telephone-exchange numbers, is ordinarily done in said first column, the master-wheel shaft 66 is normally silenced by the carriage, when traversing said first column, depressing the cam-plate 148 to disable the shaft 83 which would otherwise effect operation of the main master-wheel clutch 75 at each operation of a numeral-type key-lever. Said normal silencing of the master-wheel shaft 66 by the carriage for said first column may be countered or avoided, in order that registers No. 2 and No. 3 may be cleared by subtraction concomitantly with typing said grand totals under said first column. For this purpose, the link 160 and arm 161 in the train from said cam-plate 148 to the bell-crank 159 have a connection designed to permit restoration of said bell-crank 159 and link 160 while the cam-plate 148 is depressed at said first column. Said connection includes a coupling lever or trigger 288, pivoted at 289 to said link 160 and normally positioned on the latter against a stop 286, Figure 3, so that an arm 290 thereof opposes an abutment in the form of a stud 291 of the arm 161, whereby when the shaft 149 is rocked by depression of said cam-plate 148, it is normally effective to thrust said link 160 forwardly to rotate the bell-crank 159 to rock the clutch-control shaft 83 to the Figure 3 disabled position, and thereby cause the master-wheel shaft 66 to be silenced.

By rocking said coupling lever or trigger 288 to the Figure 10 position, its arm 290 clears the stud 291 of the arm 161, whereupon a spring 292 pulls said link 160 rearwardly and rocks the bell-crank 159 counterclockwise to release the clutch-control shaft 83 for consequent restoration of the latter by means of the spring 96, Figures 3 and 7; said spring 99 being stretched when the arm 84 of said rock-shaft 83 recedes from the clutch-operating bell-crank 85 at the rocking of said shaft 83 to its disabled, Figure 3 position.

A pin-and-slot connection 293 permits said link 160 to move independently of said arm 161.

The described countering of the normal silencing of the master-wheel shaft 66 by the carriage may be effected concomitantly with subtraction-setting of the state-control lever 102, which must be effected preparatory to printing said grand totals and clearing the No. 2 and 3 grand-total registers, the latter successively traversing, see Figures 12 and 14, the master-wheel 135 when the grand totals a and b are respectively typed in the first column. During typing of the grand total of the taxes alone and clearing it from the register No. 3 by means of said master-wheel 135, the No. 1 register traverses the master-wheel 134, as in Figure 12, and it is therefore necessary to silence said master-wheel 134 preparatory to printing said grand total. This may also be done concomitantly with the aforementioned subtraction-setting and concomitantly with the described countering of the silencing of the master-wheel shaft 66, it being understood that said master-wheel 134 may be re-silenced, by means of its individual clutch 175, independently of said master-wheel shaft 66.

The countering of the silencing of the master-wheel shaft 66, the subtraction-setting and the individual re-silencing of the master-wheel 134 may be done concomitantly with the operation of any one of the aforementioned higher denomination tabulating key-levers 143 to tabulate the carriage for the grand totals. As already described, there occurs concomitantly with operation of any one of the higher denomination tabulating key-levers 143, an operation of the subtraction-setting rock-shaft 245, and an operation of the bail 253 for unclutching the master-wheel 134 from the master-wheel shaft 66. For making the countering of the normal silencing of the master-wheel shaft 66 concomitant with these functions, the subtraction-setting rock-shaft 245 has an arm 294 connected by a link 295 to the coupling lever 288, so that as said rock-shaft 245 is operated by means of one of said higher denomination tabulating key-levers it turns said coupling lever 288 to the ineffective position, exemplified in Figures 11 and 13, for resulting restoration of the clutch-controlling rock-shaft 83 from the disabled Figure 3 position.

Since operation of the total-key lever 268 also rocks said subtraction-setting shaft 245, and works the bail 253 for silencing the master-wheel 134, and since said subtraction-setting rock-shaft 245 is connected to the coupling lever 288, as just described, it will be seen that said total-key lever 268 may be operated preparatory to grand-total typing, as, for example, when said printing is done without use of one of said higher denomination tabulating key-levers 143.

Referring to work-sheet forms other than the described telephone-bill, it may be desired to effect disconnection of the master-wheel 134 under control of the carriage for a certain zone of said other work-sheet. It may also be desired to effect such carriage-controlled disconnection of said master-wheel 134 independently of subtraction-setting or tabulating operations. To these ends, an extra cam-plate 296, Figures 2 and 13, is provided, and has a stem connected, as at 297, to the bail 253. For a given zone of such other work-sheet, the carriage may have a tappet, similar to the tappet 141, for depressing said cam-plate 296, and thereby working said bail 253 to disconnect the master-wheel 134. Said extra cam-plate 296 has a restoring spring 287.

The operation of the machine for typing the telephone-bills will be understood from the foregoing detailed description, and may be summarized as follows.

A telephone-bill having been inserted in the machine and positioned for starting the writing of the first call-entry line, the carriage-tappet 141 will be at the dotted-line position, Figure 16, to depress the cam-plate 148, thereby rendering the master-wheel shaft 66 inoperable by any numeral type key train. The date and telephone-exchange number for said first call are now typed in the first column of the bill, as in Figure 3. As the carriage is moved to the amount-column, usually by operating one of the lower denomination tabulating key-levers 143, the tappet 141 leaves the cam-plate 148, thereby causing the master-wheel shaft 66 to become operable again at operation of any numeral-type key train. While typing the toll in the amount-column, registers Nos. 1 and 2 respectively traverse the master-wheels 133, 134, Figure 17, thereby entering the toll in these registers. Following the typing of the last toll-digit, the feed rack devices operate as in Figures 21, 23, to automatically jump the carriage three spaces to the position for typing the code-letter. Upon typing said code-letter, the feed rack devices operate as in Figures 22, 25, to jump the carriage three spaces to bring it to the tens-of-cents denomination of the tax-column. The tax is then typed and concomitantly entered in registers Nos. 1, 2 and 3, these registers at this time traversing respectively the master-wheels 97, 133 and 134, as in Figure 18. Following the typing of the tax, the carriage is returned and the platen is line-spaced for starting the entry of another call on a new line of the bill, the described operations being repeated for said new line. Thus each call is entered line by line on the bill. When the last call-entry line has been typed, the carriage is again returned to line-start position, and the platen is advanced and the carriage is tabulated preparatory to printing the bill-total at the foot of the amount-column. The operation of one of the higher denomination tabulating keys 143 to so tabulate said carriage, or the operation of the total-key lever 268, in case said carriage is otherwise positioned for the bill-total, sets the state-control lever 102 to subtraction and causes disconnection of the master-wheel 134, in Figure 19. The bill-total is now typed and at subsequent return of the carriage to line-start position the carriage tappet 231 and dog 232 cooperate to reconnect the master-wheel 134 and reset the machine to addition as in Figure 15. Succeeding bills are typed in the same manner. When a book of bills is completed, the grand totals $a$ and $b$, in registers Nos. 2 and 3, are typed at the bottom of the last bill, as in Figures 12 and 14. The necessary subtraction-setting, disconnection of the master-wheel 134 and countering of the normal silencing by the carriage of the master-wheel shaft 66 are effected preparatory to said grand-total printing, by operation of one of the higher denomination tabulating key-levers 143 or of the total-key lever 268, said registers Nos. 2 and 3 being cleared concomitantly with typing said grand totals and for this purpose traversing the master wheel 135.

A plate 298, Figures 2 and 19, attached to the master-wheel-mechanism framework, has spurs such as 299 to retain the master-wheel 134 sidewise. Said plate 298 also presents teeth 300 alongside the master-wheels 134, 135, to dog any totalizer-gear about to engage either of said master-wheels 134, 135. Similar teeth (not shown) may be provided for the master-wheels 97, 133. Tongues 301 project from the master-wheel-mechanism casing 302, Figure 8, to oppose operation, by the dog 100, of the lever 101, Figure 1, that is adjacent each punctuation-denomination 303 of a totalizer; such lever 101 having an extension 311 to oppose the dog 100 as in Figure 6, to prevent operation of a numeral-type key-lever, when the carriage is at a punctuation-space.

The clutch-shifter 258 may have an index 304 visible through an opening 305, Figure 5, to indicate whether the master-wheel 134 is connected or disconnected.

For rotatably adjusting a part, such as the clutch-head 177, or the master-wheel 135, on the master-wheel shaft 66, a hub 306, Figure 4, of such part has two set-screws 307, on opposite sides of a center line through the master-wheel shaft 66, to engage seats 308 in the latter. By alternately loosening and tightening said screws, said part may be rotatably adjusted in either direction on the shaft 66.

For their placement close together, registers Nos. 1 and 2 are included in one casing 309, as, for example, by using a large capacity totalizer and splitting the carry-over devices, as by leaving out the carry-over lever 101 that would otherwise carry from the highest denomination of the No. 2 register to the lowest denomination of the No. 1 register. The No. 3 register may be in an individual casing 310 and be placeable alongside the common casing 309 for the Nos. 1 and 2 registers. The registers may have denomination markings 312 readable against pointers 313 on a fixed plate 314, Figure 3, to indicate the positions of the registers relatively to the master-wheels.

Variations may be resorted to within the scope of the invention, and portions of the improvements may be used without others.

Having thus described my invention, I claim:

1. In a combined typewriting and computing machine having numeral type keys and a letter-feeding carriage, the combination with a master wheel and a totalizer in cooperative relation therewith at a predetermined carriage-travel-zone, of a clutch, a member universally cooperable with any one of said keys to actuate said clutch to effect driving of said master wheel by the operated key, said member being displaceable from a normal position to silence its actuation of said clutch, a spring tending to restore said member, a jack movable to operated position by said carriage at said zone, a normally effective, but disableable, operating connection between said jack and member for displacing said member to determine typing-without-computing at said zone, a spring-restored control-key operative by a momentary depression thereof to disable said connection while said jack is in operated position to thereby effect immediate restoration of said member by its spring to determine typing-with-computing at said zone, and means automatically restoring said jack when said carriage leaves said zone, said connection including provision whereby if said connection is disabled, it is restored automatically to effectivity in response to the restoration of said jack.

2. In a combined typewriting and computing machine having numeral type keys and a letter-feeding carriage, the combination with a shaft having a plurality of master wheels, and totalizers cooperative with said master wheels at a carriage-travel-zone, of a clutch, a member universally cooperable with any one of said keys to actuate said clutch to effect driving of said master wheel shaft by the operated key, said member being displaceable from a normal position to silence its actuation of said clutch and thereby silence said master wheel shaft, a spring tending to restore said member, a jack movable to operated position by said carriage at a predetermined zone, a normally effective, but disableable, operating connection from said jack to said member, a spring-restored control key operative by a momentary depression thereof to disable said connection while said jack is in operated position to thereby effect immediate restoration of said member by its spring, means automatically restoring said jack when said carriage leaves said zone, said connection being restored automatically to effectivity in response to restoration of said jack, a second clutch normally closed to connect one of said master wheels to said shaft, means effective in response to the depression of said control key to place said second clutch in open condition to disconnect said one master wheel from said shaft, and means, responsive to return of the carriage, to control said last-mentioned means to effect automatically replacement of said second clutch in closed condition.

3. In a combined typewriting and computing machine having key-controlled differential actuators and a letter-feeding carriage, the combination of a shaft universally actuatable by any actuator to enable the latter to rotate said shaft, said shaft mounting a totalizer-driving master wheel, a normally closed clutch connecting said master wheel to said shaft, a movably mounted clutch controller operatively connected to said clutch and having a cam terminating substantially in a point, a key-actuatable mover adapted to engage said cam, and having a notch to interlock with said point, to move and hold said controller in position to hold said clutch open to silence said master wheel, a spring tending to restore said controller, and means acting in response to return of the carriage to line-start position to retract said mover for resulting restoration of said controller by said spring to reclose said clutch.

HENRY L. PITMAN.